United States Patent
Huang et al.

(10) Patent No.: US 10,449,847 B2
(45) Date of Patent: Oct. 22, 2019

(54) EXHAUST PARTICULATE FILTER REGENERATION

(71) Applicant: DENSO International America, Inc., Southfield, MI (US)

(72) Inventors: Zhe Huang, Farmington Hills, MI (US); Nicholas Polcyn, Commerce, MI (US)

(73) Assignee: DENSO International America, Inc., Southfield, MI (US)

(*) Notice: Subject to any disclaimer, the term of this patent is extended or adjusted under 35 U.S.C. 154(b) by 59 days.

(21) Appl. No.: 15/702,147

(22) Filed: Sep. 12, 2017

(65) Prior Publication Data

US 2019/0077244 A1    Mar. 14, 2019

(51) Int. Cl.
| | |
|---|---|
| *B60K 6/22* | (2007.10) |
| *F01N 3/027* | (2006.01) |
| *B60L 7/10* | (2006.01) |
| *B60K 6/48* | (2007.10) |
| *B60K 6/46* | (2007.10) |

(52) U.S. Cl.
CPC .................. *B60K 6/22* (2013.01); *B60K 6/46* (2013.01); *B60K 6/48* (2013.01); *B60L 7/10* (2013.01); *F01N 3/027* (2013.01); *B60Y 2200/92* (2013.01); *B60Y 2400/204* (2013.01); *B60Y 2400/60* (2013.01); *Y10S 903/93* (2013.01)

(58) Field of Classification Search
CPC .... B60K 6/22; B60K 6/48; B60K 6/46; F01N 3/027; B60L 7/10; B60Y 2400/204; B60Y 2200/92; B60Y 2400/60; Y10S 903/93
See application file for complete search history.

(56) References Cited

U.S. PATENT DOCUMENTS

| | | | |
|---|---|---|---|
| 7,073,326 B2 | 7/2006 | Cheong | |
| 2004/0063535 A1* | 4/2004 | Ibaraki | ..................... B60K 6/44 477/3 |
| 2007/0062181 A1* | 3/2007 | Williamson | .......... F01N 3/0222 60/297 |
| 2014/0102187 A1* | 4/2014 | Andreae | ............. G01M 15/102 73/114.71 |

* cited by examiner

*Primary Examiner* — Brandon D Lee

(57) ABSTRACT

A system for regenerating an emissions particulate filter that filters particulates from exhaust generated by an engine of a vehicle. The system includes an electric heater and a generator. The electric heater heats the emissions particulate filter to burn off exhaust particulates that have accumulated on the emissions particulate filter. The generator converts kinetic energy of the vehicle into electricity during regenerative braking of the vehicle. Electricity generated by the generator powers the electric heater. Energy used to power the electric heater can also come from engine load shifting.

20 Claims, 2 Drawing Sheets

EXHAUST PARTICULATE FILTER REGENERATION

FIELD

The present disclosure relates to regeneration of an exhaust particulate filter with an electrical heater powered by energy recovered during regenerative braking.

BACKGROUND

This section provides background information related to the present disclosure, which is not necessarily prior art.

Exhaust particulate filters are widely used to filter particulates from exhaust gas, thereby preventing the particulates from being released into the atmosphere. Filters can be subject to a regeneration process to remove accumulated soot and other particulates from the filters. An exemplary regeneration process includes increasing the temperature of the exhaust gas produced by the engine, which results in increased heat being generated to burn off the particulates. While current regeneration processes are suitable for their intended use, they are subject to improvement. For example, increasing the temperature of the exhaust gas requires the engine to consume additional fuel, which undesirably reduces fuel economy. The present teachings include systems and methods for regenerating exhaust particulate filters that provide numerous advantageous, as explained in detail herein and as one skilled in the art will recognize.

SUMMARY

This section provides a general summary of the disclosure, and is not a comprehensive disclosure of its full scope or all of its features.

The present teachings include a system for regenerating an emissions particulate filter that filters particulates from exhaust generated by an engine of a vehicle. The system includes an electric heater and a generator. The electric heater heats the emissions particulate filter to burn off exhaust particulates that have accumulated on the emissions particulate filter. The generator converts kinetic energy of the vehicle into electricity during regenerative braking of the vehicle. Electricity generated by the generator powers the electric heater. Energy used to power the electric heater can also come from engine load shifting.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Figure 1:
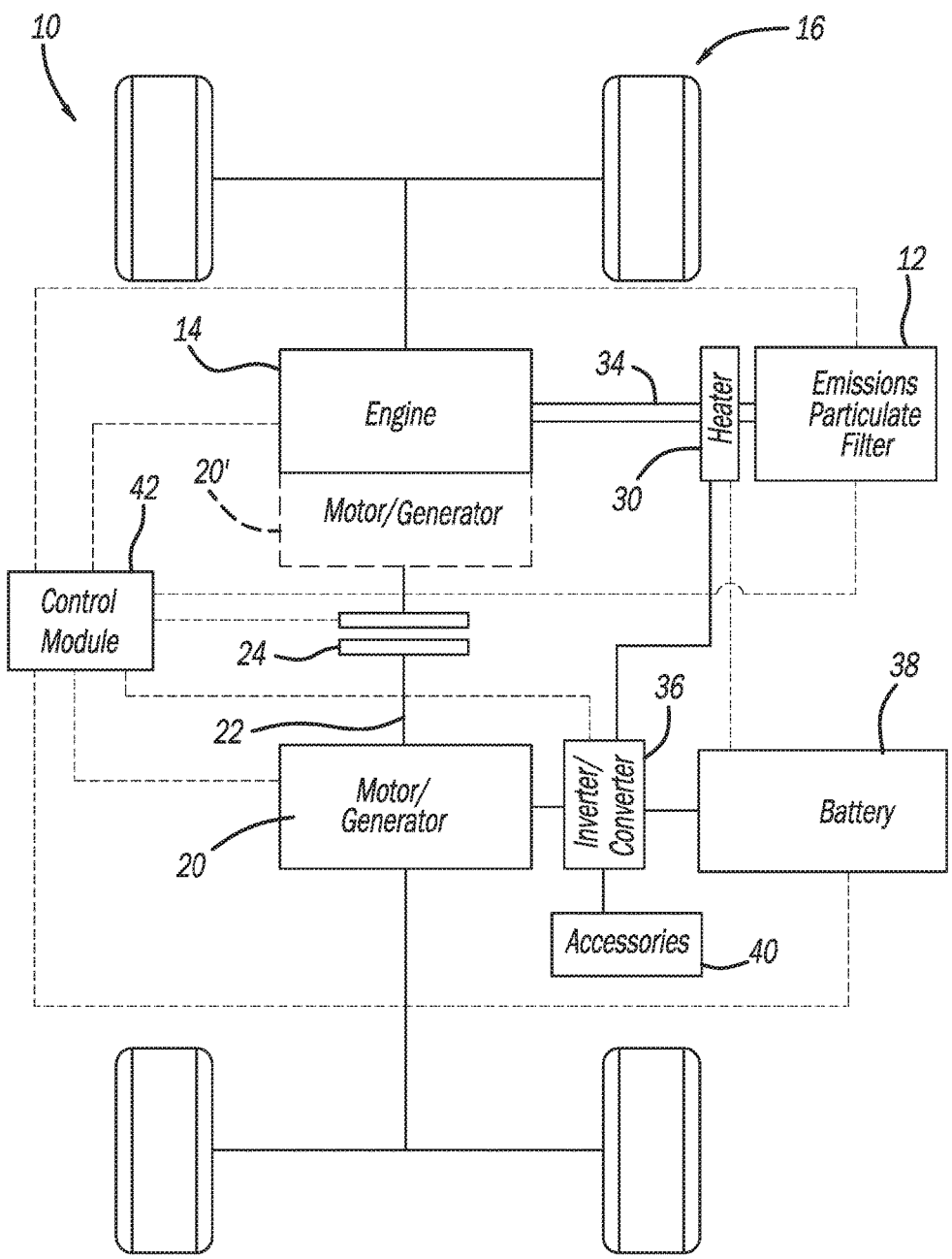
Figure 2:
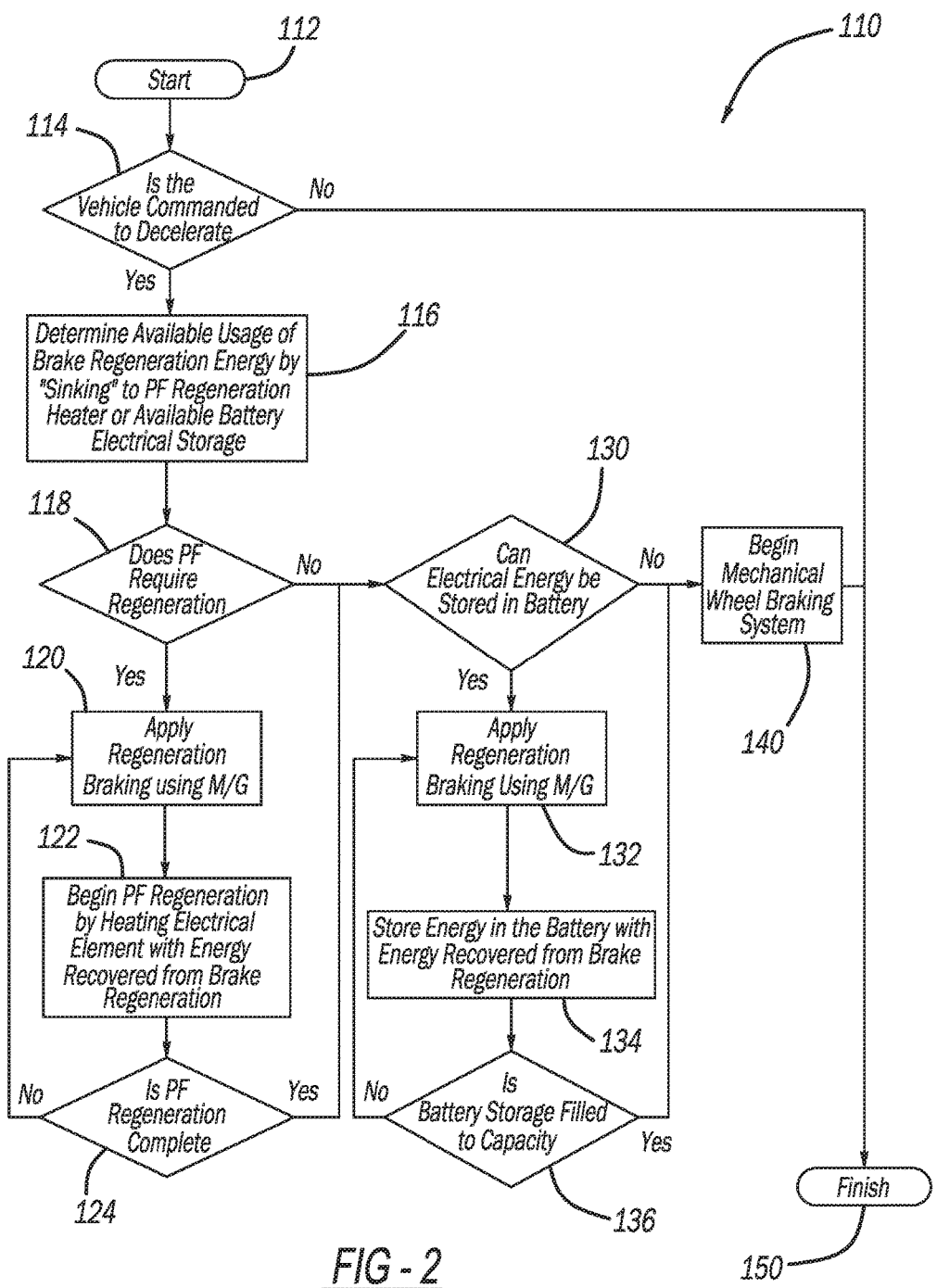

FIG. 1 illustrates an exemplary system for regenerating a particulate filter in accordance with the present teachings; and FIG. 2 illustrates an exemplary method for regenerating a particulate filter in accordance with the present teachings.

Corresponding reference numerals indicate corresponding parts throughout the several views of the drawings.

DETAILED DESCRIPTION

Example embodiments will now be described more fully with reference to the accompanying drawings.

With initial reference to FIG. 1, an emissions control system 10 for regenerating an emissions particulate filter 12 is illustrated. The filter 12 filters emissions particulates from exhaust gas generated by an engine 14 to prevent the particulates from being released into the environment. The engine 14 can be any suitable engine capable of propelling any suitable vehicle 16. The vehicle 16 can be a hybrid vehicle including a motor-generator 20. The engine 14 and the motor-generator 20 can cooperate to propel the vehicle 16 as a hybrid vehicle in any suitable manner known in the art.

The engine 14 can be any suitable engine, such as a gasoline engine or a diesel engine. The emissions particulate filter 12 can be any filter suitable for filtering particulates of interest out of the exhaust gas from the engine 14. If the engine is a gasoline engine, the particulate filter 12 can be any suitable gas particulate filter. If the engine 14 is a diesel engine, the particulate filter 12 can be any suitable diesel particulate filter.

The motor-generator 20 can be arranged along a drivetrain 22 of the vehicle 16, which includes a clutch 24 between the motor-generator 20 and the engine 14. Alternatively, the motor-generator 20 can be connected directly to the engine 14. In other applications, the motor-generator 20 can be a first motor-generator 20 arranged along the drivetrain 22, and a second motor-generator 20' can be connected directly to the engine 14.

The system 10 further includes an electric heater 30. The electric heater 30 can be any heater suitable to heat the filter 12 so as to regenerate the filter 12, such as by burning off exhaust particulates that have accumulated on the filter 12. The electric heater 30 can be arranged at any suitable location, such as along an exhaust conduit 34 that directs exhaust gas from the engine 14 to the filter 12. The electric heater 30 is powered by the motor-generator 20. Specifically, during regenerative braking, the motor-generator 20 is configured in a generator mode to convert kinetic energy of the vehicle 16 into electricity, which is directed to the electric heater 30 in order to power the heater 30.

Energy used to power the electric heater 30 can also come from engine load shifting (ELS). To power the electric heater 30 by ELS the motor-generator 20 is configured to put additional load to the engine 14 on top of what is needed for vehicle operation, such as road load, accessory load, etc. Making the engine 14 work harder can potentially increase its thermal efficiency, and the additional output can be directly used for regeneration of the emissions particulate filter 12. The direct usage cuts off roundtrip losses, which can happen when putting energy into the battery 38 and later taking energy out of the battery 38. ELS can take place in driving mode, and thus regeneration of the emissions particulate filter 12 is not limited to braking.

An optional inverter/converter 36 can be included to invert or convert the voltage of electricity generated by the motor-generator 20 in order to power the electric heater 30. The inverter/converter 36 is optional, and may not be included if no inversion or conversion of the electricity generated by the motor-generator is necessary. Furthermore, the inverter/converter 36 may be only an inverter, or only a converter, based on whether the voltage of the electricity generated by the motor-generator 20 only needs to be converted or inverted.

The system 10 further includes a battery 38. The battery 38 stores electricity generated by the motor-generator 20 when the electricity is not needed. For example, the electric heater 30 is not powered when the particulate filter 12 does not need to be regenerated, and thus the electricity generated by the motor-generator 20 can be stored by the battery 38. When the particulate filter 12 does need to be regenerated, the electric heater 30 can be powered by the battery 38, or by electricity from the motor-generator 20.

Electricity generated by the motor-generator 20 can also be used to power (or charge) any suitable accessories 40 of the vehicle 16. Suitable accessories include, but are not limited to, a stereo, entertainment system, tablet computer, smartphone, etc.

The system 10 further includes a control module 42. In this application, including the definitions below, the term "module" may be replaced with the term "circuit." The term "module" may refer to, be part of, or include processor hardware (shared, dedicated, or group) that executes code and memory hardware (shared, dedicated, or group) that stores code executed by the processor hardware. The code is configured to provide the features of the modules, controllers, and systems described herein. The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The control module 42 is configured to operate the motor-generator 20 in either a generator mode or a drive mode in which the motor-generator 20 propels the vehicle 16 either alone or in combination with the engine 14. The control module 42 is further configured to monitor the particulate filter 12 to determine when regeneration of the filter 12 is necessary. When regeneration is necessary, the control module 42 will direct electricity to the electric heater 30 from the motor-generator 20 or the battery 38 in order to power the heater 30.

The control module 42 is further configured to close the clutch 24 to operate the motor-generator 20 in a generator mode. In the generator mode, the natural resistance of the motor-generator 20 will slow the vehicle 16, and thereby the motor-generator 20 will act as a braking mechanism. Further, negative torque can be applied to increase brake regeneration power, and thus more kinetic energy can be recaptured and less will be wasted by mechanical braking. In this manner, the motor-generator 20 converts kinetic energy of the vehicle 16 into electricity that is either used to power the electric heater 30, is stored at the battery 38, or powers/charges the accessories 40. The control module 42 can be further configured to carry out the method 110 illustrated in FIG. 2, and described below.

With reference to FIG. 2, the present teachings further provide for a method 110 for regenerating the emissions particulate filter 12. The method 110 begins at block 112, and at block 114 the control module 42 determines whether the vehicle 16 has been commanded to decelerate. The control module 42 can determine that the vehicle has been commanded to decelerate in any suitable manner, such as by receiving an input from any suitable brake pedal sensor indicating that the driver of the vehicle 16 has pressed the brake pedal of the vehicle 16. If at block 114 the control module 42 determines that the vehicle 16 has not been commanded to decelerate, the method 110 proceeds to finish block 150.

If at block 114 the control module 42 determines that the vehicle 16 has been commanded to decelerate, the method 110 proceeds to block 116. At block 116 the control module 42 determines the available usage of brake regeneration energy by sinking to the electric heater or the battery 38. At block 118, the control module 42 determines whether or not the particulate filter 12 requires regeneration. The control module 42 determines whether or not regeneration of the filter 12 is needed in any suitable manner known in the art. For example, whether regeneration is needed can be based on measured resistance of current directed through the particulate filter 12. If the filter 12 does require regeneration, the method 110 proceeds to block 120. At block 120 the control module 42 configures the motor-generator 20 to apply regeneration braking. From block 120 the method 110 proceeds to block 122, where the electric heater 30 is activated by the control module 42 (and powered by electricity from the motor-generator 20).

At block 124 the control module 42 determines whether regeneration of the particulate filter 12 is complete. If regeneration is not complete, the method 110 returns to blocks 120 and 122 and regeneration continues. If regeneration is complete, the method 110 proceeds from block 124 to block 130. The method 110 also proceeds to block 130 directly from block 118 if at block 118 the control module 42 determines that regeneration is not required.

At block 130 the control module 42 measures the capacity of the battery 38 to determine whether or not electricity generated by the motor-generator 20 can be stored at the battery 38. If at block 130 the control module 42 determines that the battery 38 cannot store electricity from the motor-generator 20, such as because the battery 38 is full, the method 110 proceeds to block 140. At block 140 the control module 42 mechanically brakes the vehicle 16, such as by conventional mechanical wheel braking. If at block 130 the control module 42 determines that electrical energy can be stored at the battery 38, the method 110 proceeds to block 132. At block 132 the control module 42 operates the motor-generator 20 to apply regeneration braking. From block 132 the method 110 proceeds to block 134, at which energy generated by the motor-generator 20 during regenerative braking is stored in the battery 38. From block 134, the method 110 proceeds to block 136 where the control module 42 checks the battery 38 to determine if the battery 38 is filled to capacity. If the battery 38 is not full, the method 110 returns to block 132, and blocks 132, 134, and 136 are repeated until the battery 38 is full. When the battery 38 is full, the method 110 proceeds to block 140 and mechanical braking is commenced.

The present teachings thus provide numerous advantages. For example, the present teachings reduce the reliance on burning extra fuel to create high temperature conditions traditionally used for particulate filter regeneration. Thus the present teachings advantageously improve fuel economy and reduce emissions. One skilled in the art will realize that the present teachings provide for numerous additional advantages, and achieve unexpected results.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for regenerating an emissions particulate filter that filters particulates from exhaust generated by an engine of a vehicle, the system comprising:
    an electric heater that heats the emissions particulate filter to burn off exhaust particulates that have accumulated on the emissions particulate filter;
    a generator that converts kinetic energy of the vehicle into electricity during regenerative braking of the vehicle; and
    a control module configured to determine that the vehicle has been commanded to decelerate, determine an available usage of brake regeneration energy by sinking to the electric heater or a battery, and determine that the emissions particulate filter requires regeneration;
    wherein electricity generated by the generator powers the electric heater.

2. The system of claim 1, wherein the electric heater is arranged along an exhaust conduit that directs exhaust from the engine to the emissions particulate filter.

3. The system of claim 1, wherein the generator is connected to a drivetrain of the vehicle.

4. The system of claim 1, wherein the generator is connected directly to the engine of the vehicle.

5. The system of claim 1, wherein the generator is a motor-generator, in a generator mode the motor-generator converts kinetic energy of the vehicle into electricity during regenerative braking, in a drive mode the motor-generator at least partially propels the vehicle.

6. The system of claim 5, wherein the motor-generator is a first motor-generator coupled to a drivetrain of the vehicle; and
    wherein the system further comprises a second motor-generator coupled directly to the engine of the vehicle.

7. The system of claim 1, further comprising a voltage inverter or voltage converter that changes the voltage of electricity generated by the generator for use by the electric heater.

8. The system of claim 1, wherein the battery stores electricity generated by the generator for powering the electric heater.

9. The system of claim 1, further comprising a clutch, which is closed to use the generator as a brake during regenerative braking.

10. The system of claim 1, wherein electricity generated by the generator powers vehicle accessories.

11. An emissions control system for a hybrid vehicle, the system comprising:
    an emissions particulate filter that filters particulates from exhaust generated by an engine of the hybrid vehicle;
    an electric heater that heats the emissions particulate filter to burn off exhaust particulates that have accumulated on the emissions particulate filter;
    a motor-generator operable in a generator mode and a drive mode, in the generator mode the motor-generator converts kinetic energy of the vehicle into electricity during regenerative braking of the vehicle, in the drive mode the motor-generator supplies power for at least partially propelling the vehicle; and a control module configured to determine that the hybrid vehicle has been commanded to decelerate, determine an available usage of brake regeneration energy by sinking to the electric heater or a battery, and determine that the emissions particulate filter requires regeneration;

wherein electricity generated by the motor-generator powers the electric heater.

12. The system of claim 11, wherein the electric heater is arranged along an exhaust conduit that directs exhaust from the engine to the emissions particulate filter.

13. The system of claim 11, wherein the motor-generator is connected to a drivetrain of the vehicle.

14. The system of claim 11, wherein the motor-generator is connected directly to the engine of the vehicle.

15. The system of claim 11, wherein the battery stores electricity generated by the motor-generator for powering the electric heater.

16. A method for regenerating an emissions particulate filter that filters particulates from exhaust generated by an engine of a vehicle, the method comprising:
   determining that the vehicle has been commanded to decelerate;
   determining an available usage of brake regeneration energy by sinking to an electric heater or a battery;
   determining that the emissions particulate filter requires regeneration;
   converting kinetic energy of the vehicle into electricity with a motor-generator configured in a generator mode during regenerative braking;
   when the particulate filter is in need of regeneration, powering the electric heater with the electricity generated by the motor-generator to burn off exhaust particulates that have accumulated on the emissions particulate filter; and
   when the particulate filter is not in need of regeneration, storing the electricity generated by the motor-generator in the battery.

17. The method of claim 16, further comprising replacing regenerative braking with mechanical braking when storage capacity of the battery is full.

18. The method of claim 16, further comprising powering vehicle accessories with electricity generated by the motor-generator during regenerative braking.

19. The method of claim 16, further comprising:
   inverting voltage of the electricity generated by the motor-generator with an inverter prior to powering the electric heater; or
   converting the voltage of the electricity generated by the motor-generator with a converter prior to powering the electric heater.

20. The method of claim 16, further comprising powering the electric heater with energy generated by engine load shifting.

* * * * *